Figure 1:
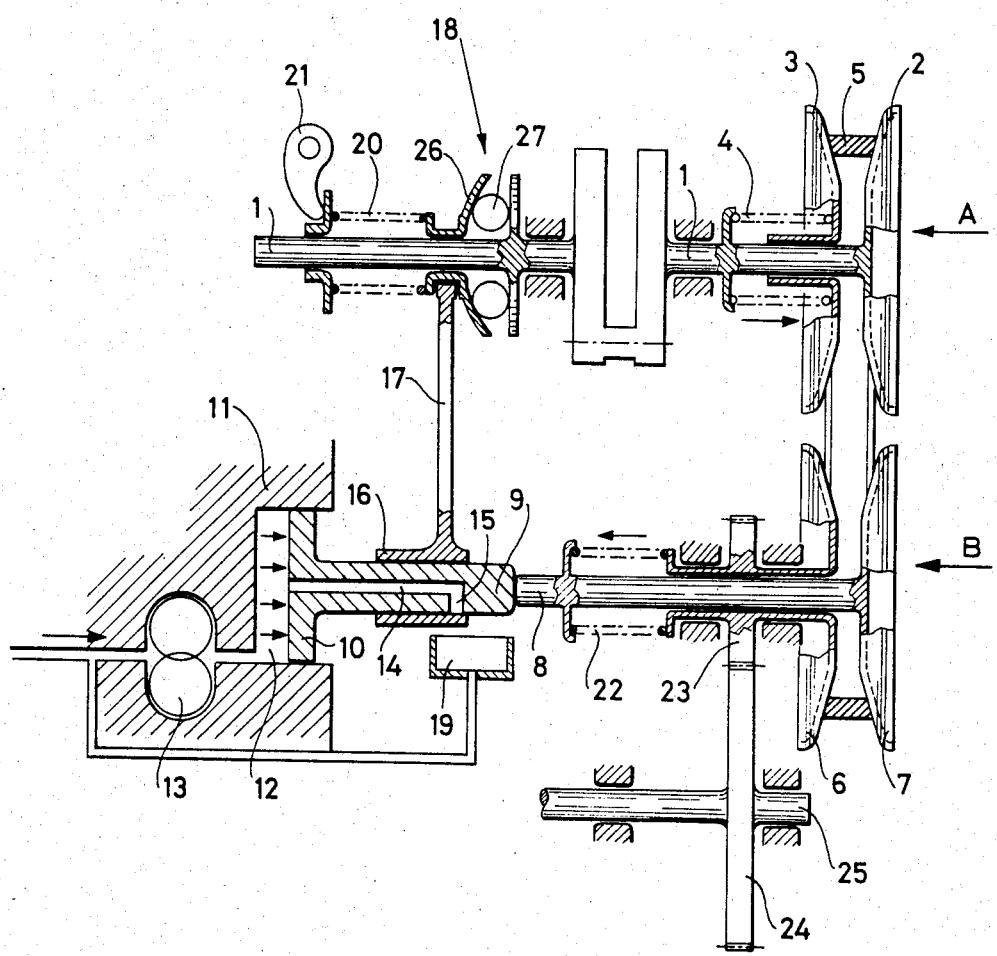

United States Patent [19]

Gaddi

[11] Patent Number: 4,585,430
[45] Date of Patent: Apr. 29, 1986

[54] VARIABLE-TRANSMISSION-RATIO MECHANICAL DRIVE WITH V-BELT AND EXPANSIBLE SHEAVES

[75] Inventor: Bruno Gaddi, Pisa, Italy
[73] Assignee: Piaggio & C. S.p.A., Genoa, Italy
[21] Appl. No.: 586,680
[22] Filed: Mar. 6, 1984
[30] Foreign Application Priority Data
   Jul. 18, 1983 [IT] Italy .............................. 22109 A/83
[51] Int. Cl.⁴ .............................................. F16H 11/06
[52] U.S. Cl. ..................................... 474/12; 474/28; 474/13
[58] Field of Search ................ 474/11, 12, 13, 14, 474/17, 28, 29

[56] References Cited
U.S. PATENT DOCUMENTS
   2,173,661  9/1939  Perrine ................................ 474/12 X
   3,600,961  8/1971  Rattunde .......................... 474/12 X
   4,228,691  10/1980  Smirl ................................... 474/12

Primary Examiner—James A. Leppink
Assistant Examiner—Frank McKenzie
Attorney, Agent, or Firm—Hedman, Gibson, Costigan & Hoare

[57] ABSTRACT

In a variable-transmission-ratio mechanical drive of the continuous variation type having a V-belt and expansible sheaves, in which each sheave has a fixed half-sheave and a movable half-sheave the position of only one of the movable sheaves is determined as a function of the speed and the load of the engine by an automatic positioning servomechanism, whereas the other movable half-sheave is subjected only to the axial load of a member which is adapted to cause the belt to adhere to said expansible sheaves.

3 Claims, 2 Drawing Figures

VARIABLE-TRANSMISSION-RATIO MECHANICAL DRIVE WITH V-BELT AND EXPANSIBLE SHEAVES

This invention relates to transmissions in which the transmission ratio varies continuously and are of the type with V-belt and expansible sheaves, more particularly with the ratio which automatically varies as a function of both the speed and the load.

It is known that such transmissions can vary continuously the transmission ratio by adopting comparatively simple constructional arrangements.

In the practical applications on motor bicycles and such-like, the variation of the transmission ratio is achieved automatically, generally by a device of the centrifugal class which acts directly upon the driving sheave and causes the latter to become closed against the bias of the spring which is active on the driven sheave, this action takes place by the agency of the tension of the belt. The result is a previously established correspondence between the speed (rpm) of the engine and the transmission ratio; this correspondence is modified only slightly by the magnitude of the transmitted torque (belt effect), in the sense of counteracting the action of the centrifugal device as the torque is increased. Such a result is far from being satisfactory since it is not possible to maintain the lowest gear ratios while exploiting the full engine power to climb steep slopes and whenever a top pick up is desired, even when the vehicle speed is comparatively high, or, conversely, it becomes difficult to pass to higher gear ratios when a silent run under economy-run conditions is desired. Attempts towards offsetting this drawback have been made by adding mechanical devices responsive to the transmitted torque, but with poor results, however, because very high loads would be required, which are difficult to embody constructionally, for counteracting, throughout the entire range of operative rpm values the effect of the centrifugal device: moreover, such devices introduce into the regulation system considerable frictional forces which, being added to those of the centrifugal device itself, reduce the sensitivity of the latter device too much.

In the practical applications on motor cars, an approach is known which is torque sensitive and consists of a pneumatic servomechanism actuated by the negative pressure downstream of the carburettor throttle, said pressure being variable as the accelerator pedal position is varied, but the direct mechanical control of the centrifugal device on the driving sheave remains unaltered and thus the high frictional forces also remain unaffected. More sophisticated approaches are also known with a regulation which is completely made with intermediary members and in which both the expansible sheaves are controlled by fluid-actuated hydraulic rams, the pressure of which is modulated as function of the engine rpm and the required load, the operation of such mechanisms being fully responsive to the expected. Such a contrivance however is too intricated to be adopted on small vehicles.

In addition, inasmuch as these approaches retain their functional feature, which is common also the mechanical approaches discussed above, and which consists in obtaining a determined ratio through the balance of the forces applied to the two sheaves both from the outside and from the belt, they are considerably influenced by the inevitable variations of the internal frictional forces of the entire regulation and drive-transfer assembly, the variations of the viscosity of the working fluid and the dimensional variations due to the inevitable machining allowances of all their component parts and especially of the resilient members, so that their characteristics can vary considerably both due to mass production and the conditions of practical use. Such devices thus require accurate and expensive checking operations during construction.

This invention has the task of overcoming the defects of the automatic mechanical control transmissions without incurring the intricacy of the integral hydraulic control system and, in addition, the invention aims to overcoming the aforesaid difficulties inherent in maintaining the specifications in a mass production and in use in order to become enabled to apply the transmission system to small vehicles.

To solve this problem, according to the invention, a transmission system is suggested having mechanical control and a transmission ratio variable continuously of the V-belt and expansible sheave type, each sheave comprising a fixed half-sheave and a movable half-sheave, said system being characterized in that only the movable half-sheave of either of said expansible sheaves is held in the position corresponding to the transmission ratio as determined by the preselected law of dependence on the engine rpm and load, by means of a servomechanism which automatically varies the position, whereas on the movable half-sheave of the other expansible sheave the axial load is applied of a member which is adapted to provide the adherence of the belt to both said expansible sheaves.

By so doing, the transmission ratio which is obtained is, therefore, no longer consequent to the balance of the axial loads which are applied to both sheaves, in combination with the "belt effect", but is only and exclusively a consequence of the relative positioning as established with accuracy for the two half-sheaves of the sheave which is controlled by the servomechanism in question.

More particularly, such servomechanism can be controlled, also as a function of the engine rpm and of the position of the accelerator control of the same engine, by a centrifugal governor having a biassing spring which can be variably preloaded, the spring being servoed to the accelerator control and the preselected transmission ratio is obtained by the positioning of the collar of said governor through a follower hydraulic mechanisms which determines the position of said either half-sheave. The physical law which binds the variables, speed, throttle angle of aperture and transmission ratio, is previously established as a function of the features of the engine and the vehicle and is embodied in the particular characteristic of the centrifugal governor which is made properly variable as the throttle aperture angle varies, by a biassing spring the flexibility of which is variable as a function of the stroke and also of the preload.

The sensitivity of the regulation system provided by the invention is thus made independent of the friction between the belt and the sheaves, of the axial relative sliding friction of the half-sheaves and the viscosity variation of the motive fluid. The physical law of variation of the transmission ratio is thus influenced only by the constructional characteristics of the mechanical regulation system, said characteristics being easily controlled. A variation of the preselected law of variation of the ratio can be achieved only by adopting belts of a different length; such as variation can be corrected during the initial calibration operations for the device and/or during practical use.

Figure 2:
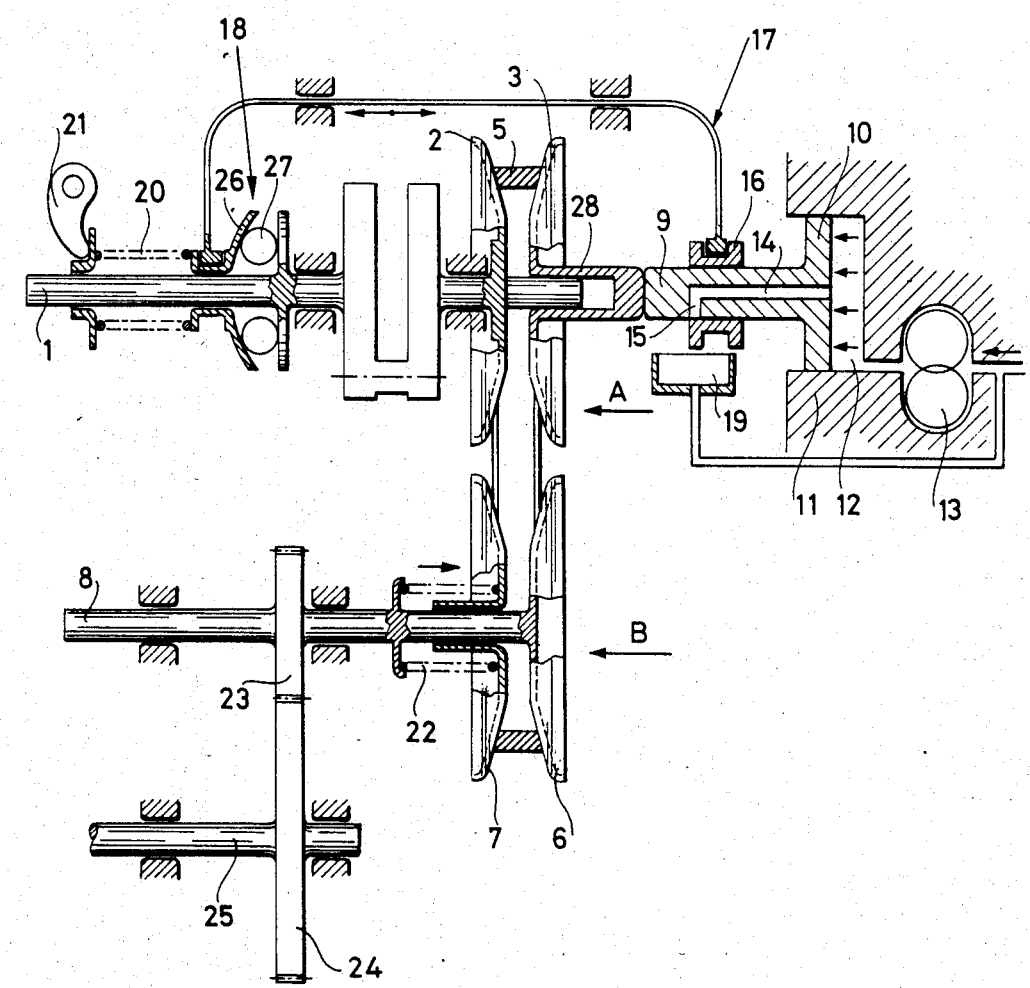

For a better understanding of the invention, two embodiments have been diagrammatically shown by way of example only in the accompanying drawings, wherein:

FIG. 1 is a constructional layout of an embodiment in which the servomechanism controls the driven sheave and FIG. 2 is a constructional layout of another embodiment in which the servomechanism controls, instead, the driving sheave.

In the embodiment shown in FIG. 1, the transmission system comprises a driving sheave A driven to rotation by a driving shaft 1 and composed of a fixed half-sheave 2, an axially slidable half-sheave 3 and a resilient member 4 which is active in the sense of mutually approaching the two half-sheaves 2 and 3, squeezing and tensioning the V-belt 5.

By means of the V-belt 5 the driven sheave B is caused to rotate and is composed of an axially fixed half-sheave 6 and an axially slidable half-sheave 7 integral with a shaft 8. The half-sheave 7 is urged by a spring 22 so as to take the closed position (close to the fixed half-sheave 6), against the contrary bias exerted via the tension of the belt 5 by the spring 4 active against the movable half-sheave 3 of the driving sheave A.

The bias of the spring 22 is, moreover, counteracted by the push of a hydraulic ram 10 subjected to the pressure of the motive fluid contained in the chamber 12 of the fixed cylinder 11, through the stem 9 of a piston 10 and the shaft 8. The chamber 12 is fed with a pressurized liquid by a pump 13. The fluid can exit the chamber 12 through a duct 14 formed through the stem 9 and opens to the outside through a radial port 15. The port 15 can be shut by a valve having the shape of a bushing 16 slidable over the stem 9. The bushing 16 can be shifted by the arm 17 of a movable beel 26 subjected to the thrust of the masses 27 of a centrifugal governor 18, carried for rotation by the driving shaft 1.

The shift of the bell 26 is counteracted by a spring 20, the preload of which can be varied from the outside via a lever 21 the movement of which is linked to the position of the accelerator control lever (not shown).

The outline of the internal surface of the bell 26 and spring 20 of the governor 18 have a shape and a characteristic, respectively, such that they provide the preselected physical law of the variation of the rpm as a function of the engine torque, as outlined hereinbefore.

The displacement of the piston 10 as caused by the pressure of the motive fluid, originates, through the shaft 8, the shifting of the half-sheave 7 towards the positions corresponding to the lower gear ratios, overcoming the bias of the spring 22.

To every position of the bell 26, as a function of the engine rpm and the position of the accelerator control lever, there corresponds univocally a position of the bushing 16 and thus of the piston 10.

The piston 10, in fact, finds its balance when the port 15 is so widely open as it is necessary to deliver the entire rate of flow of the pump 13 and the pressure drop through the port 15 is such as to originate a resistive force which is equal to the bias of the spring 22 minus the load acting upon the slidable half-sheave 7. Thus, the half-sheave 7 must follow the axial shift of the bushing 16. The liquid delivered through port 15 is received in a tank 19 from which it is drained away by the pump 13.

The drive is received at the outside by a shaft 25 through the couple of gears 23 and 24, of which gear 23 is integral with the fixed half-sheave 6 of the driven sheave B.

In the embodiment shown in FIG. 2 the transmission system essentially comprises the same component parts as in FIG. 1, with the exception that the servomechanism is active on the driving sheave A.

Like parts corresponding to those shown in FIG. 1 are connoted with the same numerals in FIG. 2. The fixed half-sheave 2 of the driving sheave A is once again integral with the mainshaft 1, whereas the movable half-sheave 3 is integral with a shaft 28. Shaft 28 is kept in contact with the stem 9 of the hydraulic ram 10, slidable in the fixed cylinder 11, by the thrust of the movable half-sheave 3 urged axially by the pull of the belt 5 as originated by the bias of the spring 22 which is active on the movable half-sheave 7 of the driven sheave B. Also in this case the variable-capacity chamber 12 is defined between the piston 10 and the cylinder 11, the chamber being fed by the pump 13 with a pressurized liquid. The liquid can exit the chamber 12 through the duct 14 and the radial port 15 and it is collected in the tank 19 from which it is drained away by the pump 13. The port 15 is throttled by the bushing 16 connected via the arm 17 to the movable bell 26 of the centrifugal governor 18, the latter being rotated by the mainshaft 1.

The shift of the bell 26 is resisted by the spring 20, which can be preloaded variably by means of the lever 21, the movement of the latter being servoed to the position of opening of the accelerator control lever.

In this case a single resilient member 22, is enough instead of two(4 and 22) shown in FIG. 1, since the relative bias serves also to provide the positioning of the transmission system in the lowest gear ratio when the engine is stopped.

The operation of the transmission system according to FIG. 2 is very much the same as that of the previous example on taking into account, however, that in the case of FIG. 2 an rpm increase of the engine commands the closure of the driving shave A instead of opening the driven sheave B.

Also in the example of FIG. 2 the drive is collected at the outside by a shaft 25 via a couple of gearwheels 23 and 24.

On the basis of what has been described above, the sensitivity of the governor is conditioned only by its internal frictional forces and not also by those which oppose the variation of the drive-transfer ratio. The constructional simplification of the servomechanism is evident since it contains only a single-effect hydraulic ram. Lastly, inasmuch as the centrifugal regulator 18 can be small sized, also the force required to vary the preload of its spring 20 is small, so that the preload variation can be obtained manually and simply.

Due to its properties as outlined above the transmission system according to the invention lends itself particularly to being applied to motor bicycles and such like, driven by internal-combustion engines.

It is understood that the invention can be embodied variously from the constructional standpoint without departing from its basic idea. For example, the centrifugal governor 18 can also be of a nonmechanical type such as of an electrical or a hydraulic type and can also be influenced by other variables or it can be subjected to the direct action of the motor bicycle driver.

I claim:

1. A mechanically driven transmission system for continuously varying the transmission ratio between a drive shaft and a driven shaft, comprising:
   a driving means for rotating the drive shaft;
   a pair of expandable sheaves, each of which comprises an axially fixed half-sheave and an axially movable half-sheave, the first of said pair of sheaves connected to the drive shaft and the second of said pair of sheaves connected to the driven shaft;
   a V-belt driving means connecting each of said pairs expandable sheaves;
   a resilient member associated with the driven shaft and normally urging said movable half-sheave toward said fixed half-sheave of the driven shaft;
   an hydraulic servomechanism for positioning said movable half-sheave of the driven shaft against the bias of said resilient member;
   said hydraulic servomechanism comprising:
   a pump for providing a pressurized motive fluid;
   a single acting hydraulic piston in communication with said moveable half-sheave of the driven shaft and actuated by said motive fluid;
   an outlet valve adapted to control an outlet port formed in said hydraulic piston for controlling the flow of said motive fluid therethrough;
   a governor for controlling the position of said outlet valve as a function of the speed and load of said driving means thereby providing the force for positioning said movable half-sheave of said driven shaft.

2. A transmission system as in claim 1, wherein said governor is of the centrifugal mass type comprising biasing springs which are variably preloaded and servoed to said driving means accelerator control.

3. A transmission system as in claim 1 wherein said hydraulic piston of said servo mechanism communicates with said moveable half-sheave of the drive shaft and is counteracted by the tension of said V-belt driving means by the load of said resilient member acting on said movable half-sheave of said driven shaft.

* * * * *